May 18, 1943. C. H. PHELPS 2,319,516
GAS FLOW INDICATOR
Filed Nov. 28, 1941
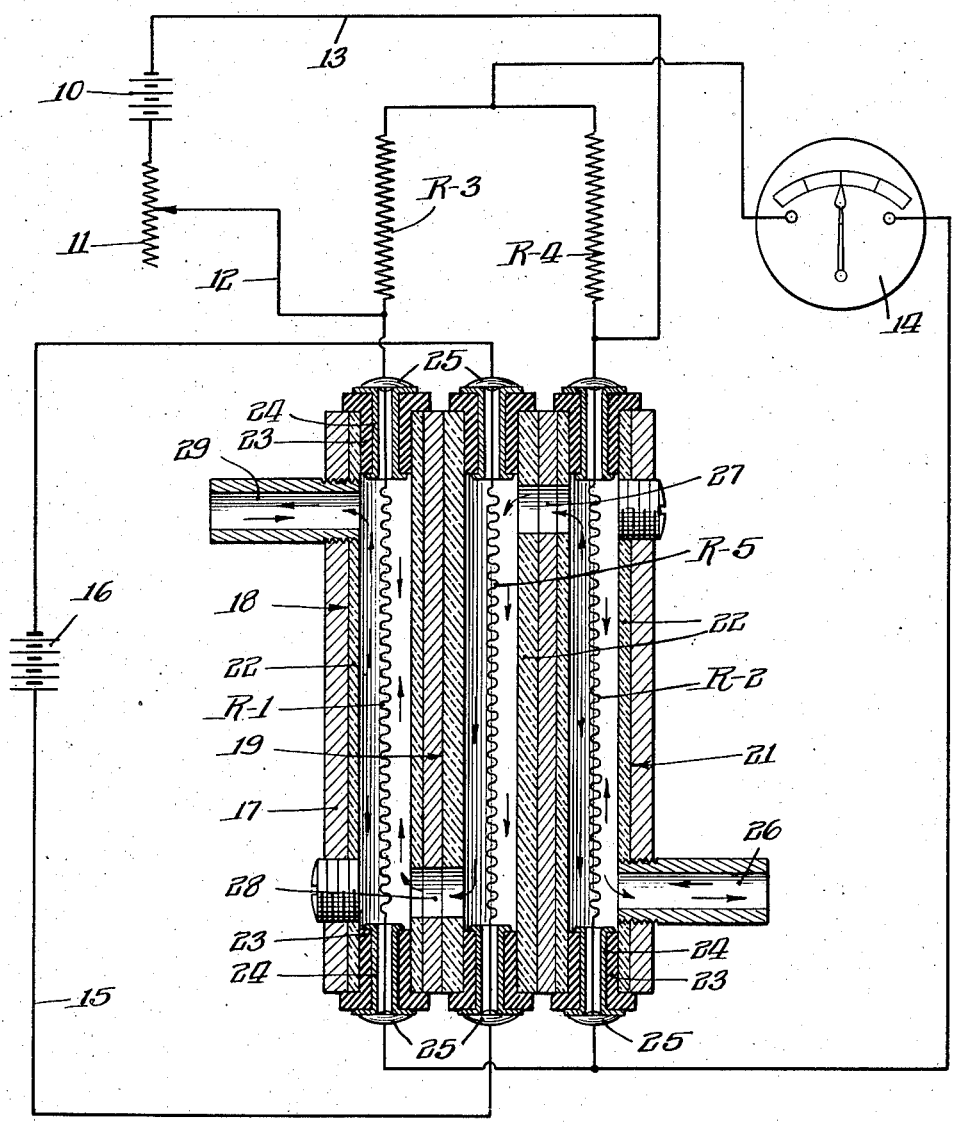
INVENTOR.
Clyde H. Phelps
BY Walter M. Fuller attys Patented May 18, 1943

2,319,516

UNITED STATES PATENT OFFICE 2,319,516

GAS FLOW INDICATOR

Clyde H. Phelps, Springfield, Ill., assignor to Weaver Manufacturing Company, Springfield, Ill., a corporation of Illinois Application November 28, 1941, Serial No. 420,850

3 Claims. (Cl. 73—204)

The present invention relates to novel features of benefit in gas-flow indicators of the electrical-type, and it concerns more particularly, but not necessarily exclusively, appliances of this character for use in the field where minute flow or low pressure indications are required, such, for instance, as the determination of stack or flue draft, fire-box pressure, and in other applications wherein pressure, either superatmospheric or subatmospheric is encountered in a range from .001 to .1 inch of water-column.

The usual practice in flue and stack draft measurements involves the employment of a fluid-operated, inclined glass-tube, which must be carefully leveled and maintained at a substantially-constant temperature and which is difficult to use where the pressure is very low due to the fact that there is little change in liquid-level with a pressure as small as that specified above.

Nickel, copper, platinum and some other metals change their resistance materially to the passage of electric-currents with modification of their temperatures, whereas some alloys, such as manganin, have substantially unvarying resistance over comparatively wide temperature ranges, and this invention employs the combination of these extremes in an electrical-circuit whereby preheated air or gas is passed over a resistor the resistance of which changes in proportion to its temperature, thereby providing a suitable means of indication of the higher heat or temperature of such resistance due to the transfer of heat from the preheated source, the galvanometer of the Wheatstone-bridge circuit in which the resistances are included being calibrated in terms of flow or pressure causing the flow.

Stated somewhat otherwise, the present invention concerns improvements in draft-gauges in particular with means to show the direction of flow and to indicate whether positive pressure or vacuum is encountered, an example of such a test being means to denote the condition of a fire-box of an ordinary heating-plant to determine if an adequate draft exists, or a positive pressure is present, the latter if occurring tending to cause combustion products to escape through any existing cracks in such a furnace and to find their way into the hot-air stream from the furnace to the rooms heated, and, as combustion-products often contain carbon-monoxide, which can have a deadly effect, such a situation should not be permitted to exist.

In order to permit those skilled in this art to fully understand the invention, a current embodiment of the same has been illustrated in detail in the accompanying drawing in which the single figure shows the circuit-connections and illustrates the novel appliance in central, vertical section.

By reference to such drawing, it will be readily perceived that the well-known Wheatstone-bridge electric-circuit includes four resistors R—1, R—2, R—3 and R—4 as its like number of arms, the battery 10, for instance, of suitable voltage, supplying current through an adjustable rheostat 11 to the circuit by connections 12 and 13 to the points between the resistances R—1 and R—3 on the one hand and R—2 and R—4 on the other hand, an appropriately-graduated galvanometer 14 being joined to the circuit between the resistances R—3 and R—4 and between the resistances R—1 and R—2 as is common practice in the employment of a system of that type.

The two resistors R—3 and R—4 are composed of a material which does not materially change its resistance with alterations in temperature, whereas the resistors R—1 and R—2 are of a material which has a high temperature resistance co-efficient and will therefore modify their resistances readily with temperature changes.

A fifth resistor R—5 is of substantially non-changeable resistance and is electrically heated to a practically-uniform or constant temperature by its inclusion in the independent electric-circuit 15 supplied by a heating electric-current from a source 16 of direct-current or alternating-current of electricity of appropriate voltage.

The three resistors R—1, R—5 and R—2 are mounted in a single, metal cell-block 17 common to all three and composed of a metal or other material having high thermal conductivity, such, for example, as copper, aluminum or the like, in order to have a tendency to equalize the temperature throughout the entire block.

Such block has three equal-length cylindrical chambers or holes 18, 19, 21 through it in the same general plane, the two end ones 18 and 21, in the present case, being of equal caliber, whereas the central one 19 is of somewhat larger diameter.

Each such hole is lined with a tube 22 of a material of low thermal-conductivity, such, for instance, as fiber or Bakelite, and while the cell-block 17 has practically-uniform heat-distribution throughout, the chambers or compartments within two of the tubes are insulated from the heated central resistor R—5 whose associated tube or encasing lining 22 is desirably somewhat thicker than the other two.

Each end of each such hollow cylindrical liner 22 has an electrical-insulation sleeve 23 fitted snugly therein, such sleeve having an enlarged head outside of the block 17 and overlying the adjacent end of the tube and an adjoining portion of the block 17, each such sleeve accommodating a hollow rivet 24 within it, the outer end of which is closed by an electric-terminal 25. Each of the three resistors R—1, R—5 and R—2 has its opposite ends connected, as by solder or otherwise, to the two terminals 25, 25 of its corresponding chamber formed by the liner and its end closures.

From the drawing, it will be seen that a pipe or conduit 26 connects from the outside of the block 17 with one end of the chamber housing resistor R—2, that a port 27 connects the opposite end portion of such chamber or cell with the corresponding end of the middle compartment accommodating resistor R—5, that the other end portion of such central chamber is connected to the adjacent end of the third cell encasing resistor R—1 by a port 28, and that the other end of such latter cell is fitted with a pipe or tube 29 opening exteriorly of the block.

Thus the three chambers are joined together in series relation from the one pipe 26 to the other 29, with the uniformly and continuously heated resistor R—5 occupying the intermediate chamber or cell.

Assuming that the parts are coupled up as illustrated with direct electric-currents supplied to the Wheatstone-bridge part of the system and that an electric-current has been applied to the resistor R—5 to bring it up to its predetermined heat limit and is maintaining it continuously and unvaryingly thereat, the galvanometer will have a zero reading with no air or gas flow through the connected cells of the block.

If now a source of gas-pressure is connected to the interior of the block as, for example, through the pipe 26, the air-stream passes through the chamber of resistor R—2 around the latter, then through the middle chamber where it is heated by the resistor R—5, and then as it flows through the third chamber, it transfers heat, which it has absorbed in the middle chamber, to the resistor R—1 increasing the resistance thereof, and the amount of this resistance-change or unbalance of the bridge-circuit is indicated on the associated galvanometer which may be calibrated in the desired units of pressure or flow, it being apparent that the amount of resistance alteration will depend upon the rate of flow of air through the chambers and this, of course, is proportional of the pressure under investigation.

If the direction of flow through the combined or affiliated chambers were reversed, as by connecting the source of pressure with the pipe 29, instead of to the pipe 26, or by connecting pipe 26 to a source of subatmospheric pressure, the accompanying reverse flow of air through the chambers or cells would cause heat-units to be conveyed from resistor R—5 to resistor R—2, thus shifting the galvanometer-needle in the opposite direction an amount to indicate the direction of flow and its degree.

If desired, the galvanometer may be graduated to show the velocity of the flow.

Again, if both pipes 26 and 29 are simultaneously associated with different pressures, the galvanometer can be used to indicate the differential directional flow.

The multiple-resistor unit herein illustrated and described is simple and rugged in structure, is relatively inexpensive to manufacture, is reliable in operation, and is unlikely to become damaged or injured in ordinary service.

The source of current 16 may be of three volts or any other suitable amount, each of the resistors R—1, R—2, R—3 and R—4 may be of about 25 ohms each, the galvanometer may be one of approximately 25 ohms, and the resistor R—5 may be of 50 ohms, but, of course, it will be understood that they are subject to change as occasion dictates, and it is to be remembered that the details of structure and arrangement of parts is presented by way of example and changes and modifications may be resorted to without departure from the scope of the invention as defined by the appended claims.

I claim:

1. For use in a gas-flow indicating-system, a resistance-device including in combination a member having first, second and third chambers connected together in series relation in that order whereby gas may flow through said series in either direction, said member having an external port for each of said first and third chambers, and first, second and third electrical-resistances in said respective chambers, said first and third resistances being adapted for electrical connection in a Wheatstone-bridge system, said second resistance being adapted for inclusion in a separate heating electric-circuit, the combination of novel features being that said member is of relatively-high heat-conductivity, said chambers are elongated and are substantially parallel with one another, said ports are at opposite end portions of said first and third chambers, the other end portions of said first and third chambers are connected to the opposite end portions of said second intermediate chamber, said resistances are disposed lengthwise in their respective chambers, and all in combination with heat-insulating linings in said chambers.

2. The combination of novel features set forth in claim 1 including the additional novel feature that the insulating-lining of said second-chamber is of greater insulating-capacity than the linings of said first and third chambers.

3. The combination of novel features presented in claim 1 including the additional novel feature that said chambers extend entirely through said member, in combination with closures for the ends of said chambers having accessible electric-terminals for said resistances.

CLYDE H. PHELPS.